United States Patent
Li et al.

(10) Patent No.: US 10,171,704 B1
(45) Date of Patent: Jan. 1, 2019

(54) METHODS AND SYSTEMS FOR THICKENING AN INTERIOR REGION OF A FILL OBJECT

(71) Applicant: XEROX CORPORATION, Norwalk, CT (US)

(72) Inventors: Xing Li, Webster, NY (US); Arindam Das, Konnagar (IN); Ranita Bej, Kolkata (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/795,293

(22) Filed: Oct. 27, 2017

(51) Int. Cl.
*H04N 1/409* (2006.01)
*H04N 1/46* (2006.01)
*G06K 15/02* (2006.01)
*G06K 15/00* (2006.01)

(52) U.S. Cl.
CPC ......... *H04N 1/4092* (2013.01); *G06K 15/002* (2013.01); *G06K 15/1807* (2013.01); *G06K 15/1813* (2013.01); *G06K 15/1836* (2013.01); *G06K 15/1847* (2013.01); *H04N 1/46* (2013.01); *H04N 2201/0094* (2013.01)

(58) Field of Classification Search
CPC ......... H04N 1/4092; H04N 2201/0094; H04N 1/46; G06K 15/002; G06K 15/1807; G06K 15/1813; G06K 15/1836; G06K 15/1847
See application file for complete search history.

(56) References Cited

U.S. PATENT DOCUMENTS

| | | | |
|---|---|---|---|
| 5,054,102 A | 10/1991 | Gaborski | |
| 5,459,828 A | 10/1995 | Zack et al. | |
| 2009/0201520 A1* | 8/2009 | Hayashi | H04N 1/405 358/1.9 |
| 2015/0371122 A1* | 12/2015 | Nakamura | G06K 15/1873 358/2.1 |

* cited by examiner

*Primary Examiner* — Quang N Vo

(57) ABSTRACT

Methods and systems for thickening an interior region of a fill object are described. The method includes receiving a print job including an input image, and converting into a digital bitmap image comprised of an array of pixels, each pixel being assigned with a pixel value and an object tag information. Based on this, each pixel is defined as one of a boundary pixel of the input image, an edge pixel of the fill object in the input image, and an interior pixel of the fill object. Thereafter, the fattening of the edge pixels of the fill object, is followed by the fattening of the interior pixels of the fill object, for applying thickening to the interior region. After this, an output image is generated.

20 Claims, 6 Drawing Sheets

METHODS AND SYSTEMS FOR THICKENING AN INTERIOR REGION OF A FILL OBJECT

TECHNICAL FIELD

The present subject matter relates generally to printing systems and more particularly to a method and a system for thickening an interior or fill region of a fill object present in an input image for printing at multifunctional devices.

BACKGROUND

Printing systems or printers are used to facilitate the printing of hard copies, of electronic documents stored or prepared on user devices, for personal, business, or administrative purposes. Examples of user devices may include workstations, personal computers, personal digital assistants (PDAs), laptop computers, notebooks, smart phones, and the like. The printers can directly communicate with the user devices, or can communicate with the user devices over a network.

Generally, a user can submit a print job to the printer in the form of page description language (PDL) file from any of the user devices connected to the network. The print job can be submitted either by using a printer driver or by using a driverless web-based platform. The printer driver is normally associated with only one printer; however, the web-based platform is normally associated with all the printers connected to the network.

At the printer, a raster image processor (RIP) receives the PDL file having an input image. In an example, the input image may include one or more fill objects such as characters, words, text, and other objects such as graphics, photos, etc. The PDL file received at the RIP includes information describing the layout of the input image as it was created on the user device used by the user. Also, the RIP makes the decision on how to process the input image based on what PDL the input image is described in. Based on the decision, the RIP converts the input image from their form in the PDL file to a sequence of serial instructions for the printer in a process commonly known as "ripping" and provides a ripped image to an image storage-and-retrieval system known as a print engine. The print engine converts the ripped image into a ready-to-print (RTP) format and makes it available to the printer for printing the input image.

However, while the making the input image available to the printer, the user of the user device is provided with limited option of editing or modifying the quality of the input image including, for example, selecting some settings such as lighting/darkening of the input image. In this relation, various efforts regarding printers or printing system have been made in past for continuing developments to improve the image quality. One such effort includes fattening of stroke or edge pixels of the fill objects present in the input image for image quality enhancement. However, in such efforts, interior regions or fill regions of the fill objects remain unchanged while the edge pixels are fattened by a user-specified amount. This in turn may lead to severe content loss as the fattened edge pixels may overlap pixels present in the interior regions of the fill objects.

SUMMARY

In one implementation, a method for thickening an interior region of a fill object at a multifunctional device (MFD) is performed. The MFD may include a processor, a digital front end (DFE) module coupled to the processor, and a digital rear end (DRE) module coupled to the processor. The DFE module receives a print job comprising an input image. Upon receipt, the input image is converted into a digital bitmap image comprised of an array of pixels, where each pixel being assigned with a pixel value and an object tag information. Based on the pixel value and the object tag information, each pixel is defined as one of a background pixel of the input image, an edge pixel of a fill object in the input image, and an interior pixel of the fill object. Then, the DFE module performs fattening of the edge pixels away from the interior pixels, followed by the fattening of the interior pixels for applying thickening to the interior region defined by the interior pixels. In an implementation, the fattening of the edges pixels and the interior pixels is performed by a user-specified amount of, say, 1 pixel or 2 pixels. Further, the fattening is performed in such a way that the fattening of the edge pixels is limited to background pixels. Once the fattening of the edge pixels and the interior pixels is performed, the DRE module flattens the edge pixels and the interior pixels to generate an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

In another implementation, a multifunctional device (MFD) for thickening an interior region of a fill object comprising a processor, a digital front end (DFE) module coupled to the processor, and a digital rear end (DRE) module coupled to the processor. The DFE module receives a print job having an input image at the multifunctional device (MFD), and converts the input image into a digital bitmap image comprised of an array of pixels. In an example, each pixel being assigned with an object tag information and a pixel value. Based on the object tag information and the pixel value, the DFE module defines each pixel as one of a background pixel of the input image, an edge pixel of a fill object in the input image, and an interior pixel of the fill object. Then, the DFE module performs simultaneously the fattening of the edge pixels away from the interior pixels, along with the fattening of the interior pixels for applying thickening to the interior region defined by the interior pixels. In an example implementation, the fattening of the edges pixels and the interior pixels is performed by a user-specified amount of, say, 1 pixel or 2 pixels. Further, the fattening is performed in such a way that the fattening of the edge pixels is limited to background pixels. Once the fattening of the edge pixels and the interior pixels is performed, the DRE module flattens the edge pixels and the interior pixels to generate an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

In yet another implementation, a non-transitory computer-readable medium implementing the subject matter may include instructions executable by a processing resource. The instructions are executed to receive a print job at a multifunctional device (MFD). In an example, the print job comprising an input image. Upon receipt, the input image is converted into a digital bitmap image comprised of an array of pixels, where each pixel being assigned with a pixel value and an object tag information. Based on the pixel value and the object tag information, each pixel is defined as one of a background pixel of the input image, an edge pixel of a fill object in the input image, and an interior pixel of the fill object. Then, the fattening of the edge pixels away from the interior pixels is performed simultaneously along with the fattening of the interior pixels for applying thickening to the interior region defined by the interior pixels. In an example implementation, the fattening of the edge pixels and the interior pixels is performed by a user-specified amount of, say, 1 pixel or 2 pixels. Further, the fattening is performed in such a way that the fattening of the edge pixels is limited to background pixels. Once the fattening of the edge pixels and the interior pixels is performed, the edge pixels and the interior pixels are flattened to generate an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

In yet another implementation, a method for thickening an interior region of a fill object at a multifunctional device (MFD) is performed. The MFD may include a processor, a digital front end (DFE) module coupled to the processor, and a digital rear end (DRE) module coupled to the processor. The DFE module receives a print job comprising an input image. Upon receipt, the input image is converted into a digital bitmap image comprised of an array of pixels, where each pixel being assigned with a pixel value. Based on the pixel value, each pixel is defined as one of a background pixel of the input image, an edge pixel of a fill object in the input image, and an interior pixel of the fill object. Then, the DFE module performs simultaneously fattening of the edge pixels away from the interior pixels, along with the fattening of the interior pixels for applying thickening to the interior region defined by the interior pixels. In an example implementation, the fattening of the edges pixels and the interior pixels is performed by a user-specified amount of, say, 1 pixel or 2 pixels. Further, the fattening is performed in such a way that the fattening of the edge pixels is limited to the background pixels. Once the fattening of the edge pixels and the interior pixels is performed, the DRE module flattens the edge pixels and the interior pixels to generate an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

Other and further aspects and features of the present subject matter will be evident from the following detailed description of the exemplary implementations, which are intended to illustrate, not limit, the present subject matter.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
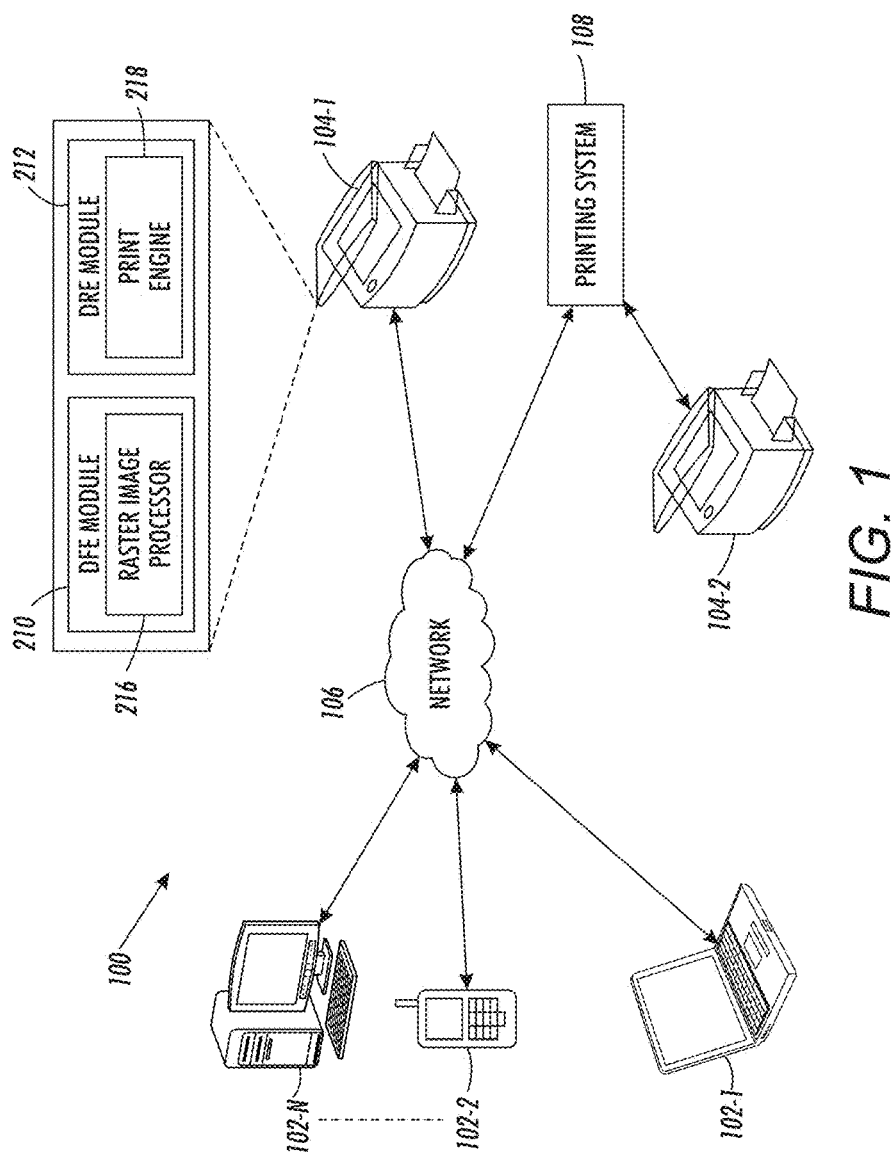
FIG. 1 illustrates a schematic network printing environment for network printing, according to an implementation of the present subject matter.

A few aspects of the present subject matter are explained in detail below with reference to the various figures. Example implementations are described to illustrate the disclosed subject matter, not to limit its scope, which is defined by the claims. Those of ordinary skill in the art will recognize many equivalent variations of the various features provided in the description that follows.

Non-Limiting Definitions

In the disclosure herein after, one or more terms are used to describe various aspects of the present subject matter. For better understanding of the subject matter, a few definitions are provided herein for better understating of the present disclosure.

"Input image" refers to a pattern of physical light captured or generated at a user device including workstations, personal computers, personal digital assistants (PDAs), laptop computers, notebooks, smart phones, and the like. The input image may include fill objects such as characters, words, text, and other objects such as graphics, photos, etc. The input image may be included in a set of one or more input images, such as in input images of the pages of a document. The input image may be divided into segments, objects, or structures, each of which is itself an image. A segment, object, or structure of the input image may be of any size up to and including the whole input image.

"Fattening" refers to a process of expanding or growing a region (shape) of objects contained in the input image. For example, a region of an object is grown or expanded by adding in neighboring pixels to original region of the object. For growing the original region of the object, first the edge pixels of the object are identified and then the edge pixels are grown to add one or more neighboring pixels, based on some user criteria, into the original region. With such addition of the neighboring pixels, the region or shape of the object is grown or expanded. In one example, such region growth or expansion of the object may be performed using well known region growing algorithm.

"Flattening" refers to a process which merge or flatten layers to reduce the file size. Flattening combines all the different layers of an input image into a single layer. In general, "flattening" refers to modifying, or correcting, the pixel intensities of the different layers on an input image to generate an output image in a single layer. For example, with the flattening process, the background layer and the foreground layer are merged to generate a single output layer.

"Printing system or print server" may be defined as including, but not necessarily limited to, a computing device, program, or combination thereof that processes request, delivers data or other information, or provides one or more services over the cloud and/or a local network.

"Client device or user device" is defined as including, but not necessarily limited to, hardware, software, or a combination thereof that accesses a server. Examples include, but are not limited to, a computing device, phone, tablet, personal digital assistant, or server.

"Printer" may be defined as including, but not necessarily limited to, a peripheral that produces a representation of a document on one or both sides of media such as paper, transparency, fabric, etc. A printer can be single function device or multi-function (e.g., including scanning, faxing, or other functionality) device. The multi-function device may include software, hardware, firmware, or combination thereof. Further, the printer can use any of a variety of different types of marking technologies such as laser, inkjet, dye-sublimation, off-set printing, thermal printing, impact, etc. As used herein, the terms "render" and "rendering" are defined as including, but not necessarily limited to, taking print data such as text, images, graphics, etc. and converting them into a ready to print (RTP) format that is compatible with a destination printer.

"Computer-readable medium" or "storage medium" may be a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data would together be storage medium.

Overview

Several attempts have been made in the past to cater the emerging requirement of image quality enhancement. One such attempt focuses on thickening or fattening of stroke or edge pixels of fill objects including characters, words, text, and other objects such as graphics, photos, etc. Such attempt is simple and effective in improving image quality, but such attempt may not always produce results that reflect the intent of the users in terms of image quality. For example, in such efforts, interior regions or fill regions of the fill objects remain unchanged. Also, such efforts may lead to severe content loss as the fattened edge pixels may overlap pixels present in the interior regions of the fill objects.

Various method(s) and system(s) of the present subject matter described herein facilitates thickening of an interior region or fill region of a fill object. In one example, a user of a user device (or a client device) may access a portal for submitting a print job with a printer. The portal may be accessed, for example, by executing a web application or by accessing a uniform resource location (URL) address through a web browser. The portal may present a user interface, such as a print dialogue box or a graphical user interface (GUI), which allows the user to submit an input image to be printed and various other print options including, but not limited to, selection of a user-specified amount of, say, 1 or 2 pixels, for fattening of the interior region of a fill object present in the input image.

Upon submission of the print options, the print job is transmitted to the printer in the form of page description language (PDL) file such as PostScript (PS), Portable Document Format (PDF) and Extensible Markup Language (XML) Paper Specification (XPS). The PDL file may include information about various fill objects, say, characters, words, text, graphics, photos, and the like, contained in the input image present in the PDL file. The information may describe the appearance of the fill objects present within the input image, and may include a set of programming language commands for processing the input image based on the information. In one example, the PDL file may include rendering information on how to render the fill objects present in the input image.

Further, based on the commands and information present in the PDL file, the printer decomposes the PDL file to determine whether any graphic object in the input image is a fill object, followed with determining whether the fill object is selected by the user for performing fill thickening. In case it is determined that the fill thickening for the fill object has been selected, the printer converts the input image present in the PDL file into a digital bitmap image comprised of an array of pixels. In an example, each pixel comprised in the digital bitmap image is assigned with a pixel value and object tag information. Based on the pixel value and the object tag information, the printer determines edge pixels of the fill object, a boundary pixel of the input image, and interior pixel of the fill object.

Edge pixels are also known as "stroke pixels". The edge pixels are defined as transition between a background and a foreground of the input image. That is, the edge pixels define the transition between background pixels and foreground pixels.

The background pixels are defined as pixels having relatively little or no printable information within. Printable information is a digital value or a pixel value assigned to a pixel which results in a certain color and amount of printing material, such as ink or toner, to be deposited on a printable medium, such as paper, where the color and amount of the printing material has a functional relationship to the pixel value. For example, a pixel value for a pixel may represent yellow color may mean that the ink or toner of yellow color being deposited for that pixel, resulting in a visually yellow pixel.

The foreground pixels are defined as pixels having some printable information within. The foreground pixels may be either the edge pixels or interior (fill) pixels. The interior pixels are foreground pixels that are not the edge pixels. The interior pixels can be distinguished from the background pixels in that if a pixel is not an edge pixel (from above) and if in the input image the pixel is a 0 (no printing information) then the pixel is a background pixel. Further, the interior pixels are generally enclosed or surrounded by the edge pixels to enclose a fill area of the fill object.

Returning to the present subject matter, when the background pixels, the edge pixels, and the interior pixels are determined or defined for the fill object based on the associated tag information and pixel values, fattening of the edge pixels and the interior pixels is performed simultaneously by the user-defined amount. In an example, the user-specified amount can be 1 pixel or 2 pixels depending on user's choice or selection.

The edge pixels are fattened in such a way that the fattening of the edge pixels is restricted or limited to the background pixels. Further, the interior pixels are fattened by the user-specified amount for applying thickening to the interior region defined by the interior pixels. Once the fattening of the edge pixels and the interior pixels is performed, an output image is generated for printing at the printer in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

Thus, with the implementation of the present subject matter, interior (fill) region of the fill object can be thickened or expanded as per user's choice without affecting the thickness of the edge or stroke of the fill object, so that the effect of the edge pixels on the fill object remains the same. Further, the implementation of present subject matter achieves the effect of fill (interior) thickening without undesirable artefacts. Also, the present subject matter ensures no content loss and no additional artefacts occur.

Exemplary Implementations

The following disclosure explains a mechanism where a printing system, such as print server, with some hardware and software enhancements, is enabled to facilitate a user of a user device (or client device) to allow configuring of thickness of an interior region of a fill object to support image quality enhancements. Such printing system is further described with reference to FIGS. 1, 2, 3, 4A-4B, 5A-5B, 6 and 7.

It should be noted that that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

FIG. 1 illustrates, as an example, a printing environment 100 for printing of electronic documents, according to an implementation of the present subject matter. The printing environment 100 includes a plurality of user devices 102-1, 102-2, 102-N, hereinafter collectively referred to as user devices 102 and individually as user device 102. Examples of the user devices 102 may include, but are not limited to, workstations, personal computers, personal digital assistants (PDAs), laptop computers, notebooks, smart phones, smart cameras, smart television sets, and other smart devices.

Further, the printing environment 100 can include a plurality of printers out of which two printers 104-1 and 104-2 are shown for the sake of simplicity. The two printers 104-1 and 104-2 are hereinafter collectively referred to as printers 104 and individually as printer 104. In an example, the printers 104 and the user devices 102 are connected directly over a network 106 or through a printing system 108 over the network 106. In an example, the printing system 108 may be a print server, a network server, a web server, or a data server.

The network 106 may be a single network or a combination of multiple networks. The network 106 may include one or more area networks, such as a local area network (LAN), a wide area network (WAN), an intranet, the internet, or any other type of network. In an example, the network 106 may include mobile communication network, for example, 2G, 3G or 4G mobile communication network.

In an example, a user of the user device 102-2 logins to a printing service. The printing service can be offered directly by the printer 104-1 or the printing system 108 coupled to the printer 104-2. The user can login from the user device 102-2 present anywhere in the network 106, for submission of a print job to the printing service. Further, for submission of the print job, the user device 102-2 can facilitate the user to access a (web) portal of the printing service. In an example, the user may access the portal by selecting a print command for printing an input image. In another example, the user may access the portal by directly entering a URL address of the portal in a (web) browser. In yet another example, the user may access the portal using other (web) elements, such as widgets, and web enabled applications. Further, the portal may present a user interface, such as a print dialogue box, or a graphical user interface (GUI). The user interface allows the user to provide various print options including, but not limited to, an option of selecting a user-specified amount for fattening of an interior (fill) region of a fill object present in the input image.

For the printing service, the print job from the user device 102-2 is received either by the printing system 108 or the printer 104-1, based on the user's selection. The print job is received in the form of a page description language (PDL) file. The PDL file may include information about various fill objects, say, characters, words, text, graphics, photos, and the like, contained in the input image present in the PDL file. The information may describe the appearance of the fill objects present within the input image, and may include a set of programming language commands for processing the input image based on the information. In one example, the PDL file may include rendering information on how to process the input image for rendering the graphic objects present in the input image.

Based on the commands and information stored in PDL file, the printer 104 or the printing system 108 decomposes the PDL file to determine whether any graphic object is a fill object in the input image, followed by determining whether the user has selected the fill object for fill thickening of the interior region. In case it is determined that the fill thickening option has been selected for any fill object, the input image present in the PDL file is converted into a digital bitmap image comprised of an array of pixels. In an example, each pixel comprised in the digital bitmap image is assigned with object tag information and a pixel value. For example, the object tag information may determine or define an object type associated with a particular pixel. Examples of the object types may include text, image, or graphics. Similarly, the pixel values of an input image are either 1 or 0 value. It should be noted that the pixel value of 0 represents a white color and OFF state of corresponding pixel, while pixel value of 1 represents a black/any other color and ON state of corresponding pixel. However, after conversion from a digital input image to a digital bitmap image, the digital bitmap image includes pixels values ranging from 0 to 255, where each pixel value represents different color and light intensity.

Based on the object tag information and the pixel values, the printer 104-1 or the printing system 108 determines edge pixels of the fill object, interior pixels of the fill object, and background pixels of the digital bitmap image. As described above, the edge pixels are also known as "stroke pixels." Similarly, the interior pixels are also known as "fill pixels" defining a fill region enclosed within the edge pixels of a particular fill object.

Once the background pixels, the edge pixels, and the interior pixels are determined or defined for the fill object based on the associated tag information and pixel values, the edge pixels and interior pixels are simultaneously fattened by the user-specified amount. In an example, the user-defined amount can be 1 pixel or 2 pixels depending on user's choice or selection.

The edge pixels are fattened in such a way that the fattening of the edge pixels is restricted or limited to the background pixels. Further, the fattening of the interior pixels is performed by the user-specified amount for applying thickening to the interior region defined by the interior pixels. Once the fattening of the exterior pixels and the interior pixels is performed, an output image is generated for printing at the printer 104-1 or 104-2 in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

Thus, with the implementation of the present subject matter, interior (fill) region of the fill object can be thickened or expanded as per user's choice without affecting the thickness of the edge or stroke of the fill object, so that the effect of the edge pixels on the fill object remains the same. Further, the implementation of present subject matter achieves the effect of fill (interior) thickening without undesirable artefacts. Also, the present subject matter ensures no content loss and no additional artefacts occur.

Further, in an example, the working of the printing system 108 implemented in the printing environment 100, is described in more detail with reference to FIGS. 2, 3, 4A-4B, and 5A-5B.

Figure 2:
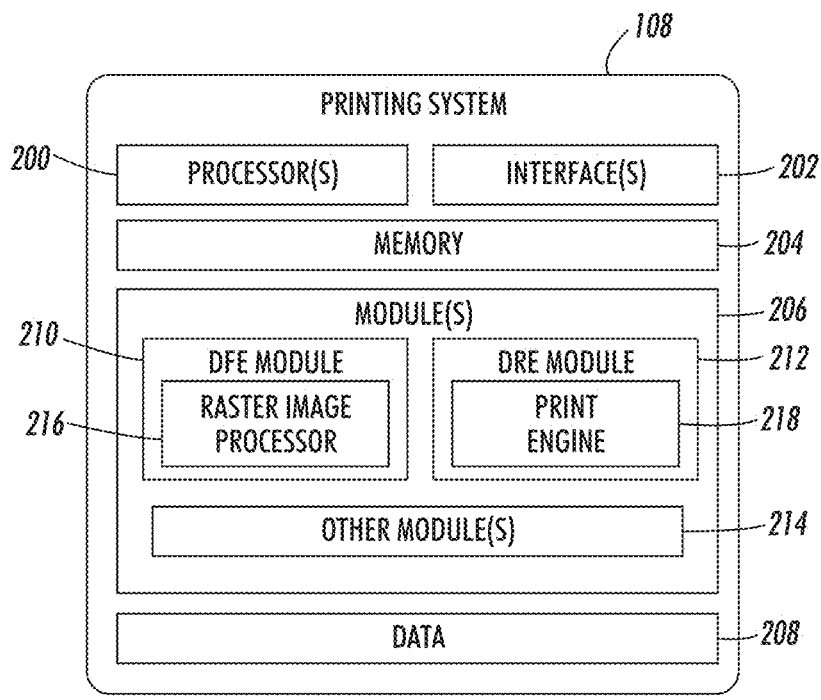
FIG. 2 illustrates a schematic of a printing system, according to an implementation of the present subject matter.

FIG. 2 illustrates various components of the printing system 108, in accordance with one implementation of the present subject matter. The printing system 108 may include a processor 200, an interface 202, and a memory 204. Further, the printing system 108 may include module(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as processor(s), may be provided using dedicated hardware as well as hardware capable of executing software in association with appropriate software.

When provided by the processor 200, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the printing system 108 to interact with different entities, such as the processor 200, the module(s) 206, and the data 208. Further, the interface(s) 202 may enable the components of the printing system 108 to communicate with other user segmenting systems, and external repositories. The interface 202 may facilitate multiple communications within a wide variety of networks and protocol types, including wireless networks, wireless Local Area Network (WLAN), RAN, satellite-based network, etc.

The memory 204 may be coupled to the processor 200 and may, among other capabilities, provide data and instructions for generating different requests. The memory 204 can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement abstract data types. The module(s) 206 may further include modules that supplement applications on printing system 108. Further, the module(s) 206 can be implemented in hardware, instructions executed by the processor 200, or by a combination thereof.

In one example, the module(s) 206 may be machine-readable instructions (software) which, when executed by a processor/processing unit, perform any of the described functionalities. The machine-readable instructions may be stored on an electronic memory device, hard disk, optical disk, or other machine-readable storage medium, or non-transitory medium. In one further example, the machine-readable instructions can also be downloaded to the storage medium via a network connection.

The module(s) 206 may perform different functionalities which may include, but may not be limited to, receiving a print job including an input image from the user device 102-2; converting the input image into a digital bitmap image comprised of an array of pixels, where each pixel being assigned with an object tag information; based on the object tag information, defining each pixel as one of a boundary pixel of the input image, an edge pixel of a fill object in the input image, and an interior pixel of the fill object; fattening the edge pixels and the interior pixels by a user-specified amount of, say, 1 or 2 pixels, for applying thickening to the interior region defined by the interior pixels; and generating an output image for printing the output image at the printer 104 in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels. In one example implementation, the module(s) 206 may include a digital front end (DFE) module 210, a digital rear end (DRE) module 212, and other module(s) 214. In one example, the DFE module 210 may include a raster image processor (RIP) 216, and the DRE module 212 may include a print engine 218.

Further, the data 208 serves, amongst other things, as a repository for storing data that may be fetched, processed, received, or generated by one or more of the module(s) 206. The data 208 may include intermediate processing data related to image processing.

In operation, the DFE module 210 of the printing system 108 receives the incoming print jobs in the form of page description language (PDL) file such as PostScript (PS), Portable Document Format (PDF) and Extensible Markup Language (XML) Paper Specification (XPS). The PDL file may include information about various fill objects, say, characters, words, text, graphics, photos, and the like, contained in the input image present in the PDL file. The information may describe the appearance of the fill objects present within the input image, and may include a set of programming language commands for processing the input image based on the information. In one example, the PDL file may include rendering information on how to process the input image for rendering the graphic objects present in the input image.

Figure 3:
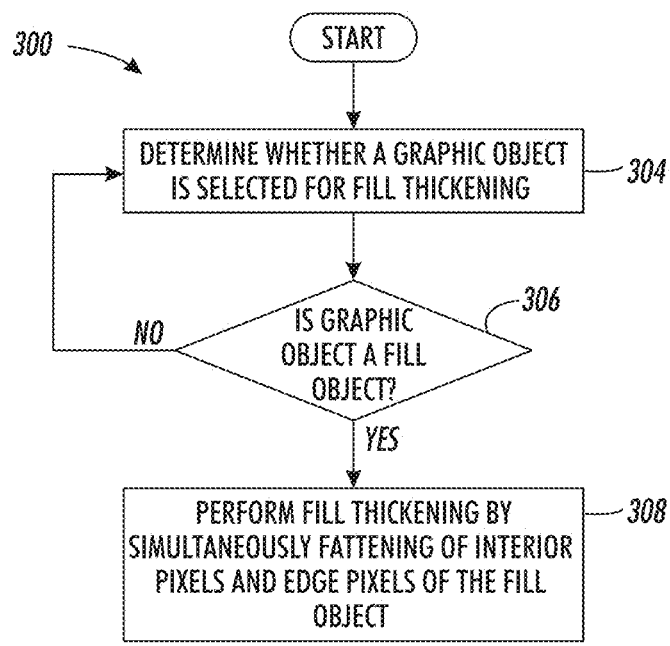
FIG. 3 illustrates a flowchart for implementing the present subject matter.

Further, based on the commands and information present in the PDL file, the DFE module 210 decomposes the PDL file to determine whether any graphic object in the input image is selected by the user for performing fill thickening, as can be seen in block 304 of FIG. 3 (flowchart 300). In case it is determined that a graphic object is selected for fill thickening, the DFE module 210 determines whether the selected graphic object is a fill object (Block 306). In case it is determined that the modification option has been selected for the fill object, the DFE module 210 initiates the fill thickening of the selected fill object by fattening the edge pixels and the interior pixels by a user-specified amount of, say, 1 or 2 pixels, for applying thickening to the interior region defined by the interior pixels in accordance with the implementations of the present subject matter (Block 308).

In an implementation of the present subject matter, for performing the fill thickening, the DFE module 210 includes a raster image processor (RIP) 216 to convert the input image present in the PDL file into a digital bitmap image comprised of an array of pixels. In an example, each pixel comprised in the digital bitmap image is assigned with object tag information. Based on the object tag information and the pixel values, the RIP 216 determines edge pixels of the fill object, interior pixels of the fill object, and background pixels of the input image.

Edge pixels are also known as "stroke pixels." The edge pixels are defined as transition between a background and a foreground of the input image. That is, the edge pixels define the transition between background pixels and foreground pixels.

The background pixels are defined as pixels having relatively little or no printable information within. Printable information is a digital value or a pixel value assigned to a pixel which results in a certain color and amount of printing material, such as ink or toner, to be deposited on a printable medium, such as paper, where the color and amount of the printing material has a functional relationship to the pixel value. For example, a pixel value for a pixel may represent yellow color may mean that the ink or toner of yellow color being deposited for that pixel, resulting in a visually yellow pixel.

The foreground pixels are defined as pixels having some printable information within. The foreground pixels may be either the edge pixels or interior (fill) pixels. The interior pixels are foreground pixels that are not the edge pixels. The interior pixels can be distinguished from the background pixels in that if a pixel is not an edge pixel (from above) and if in the input image the pixel is a 0 (no printing information) then the pixel is a background pixel. Further, the interior pixels are generally enclosed or surrounded by the edge pixels to enclose a fill area of the fill object.

Figure 4B:
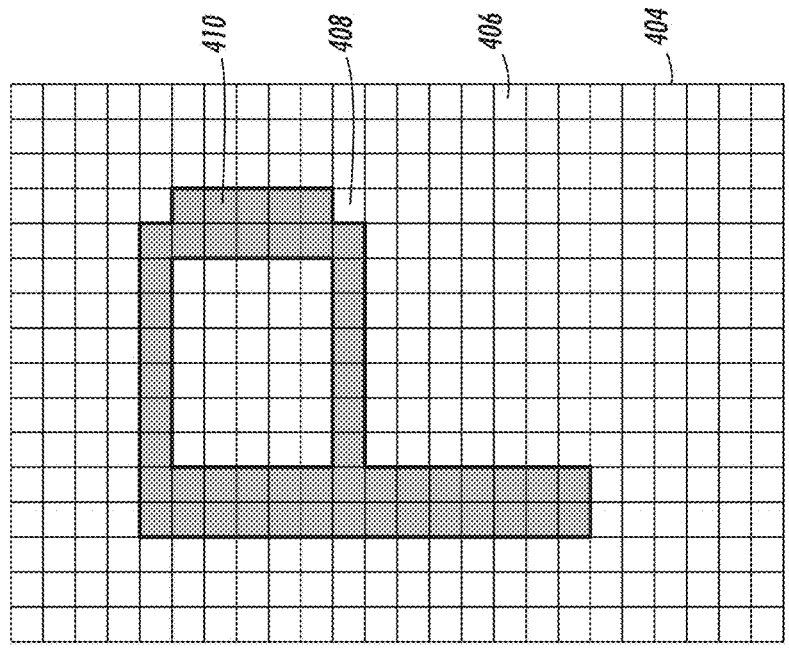
FIG. 4A and FIG. 4B illustrate an example of an input image.
Figure 4A:
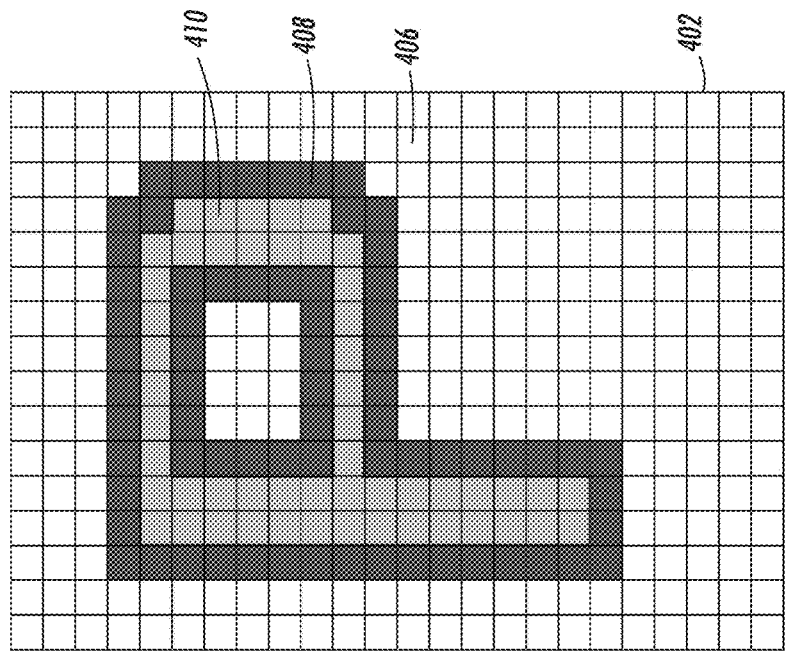
Figure 5A:
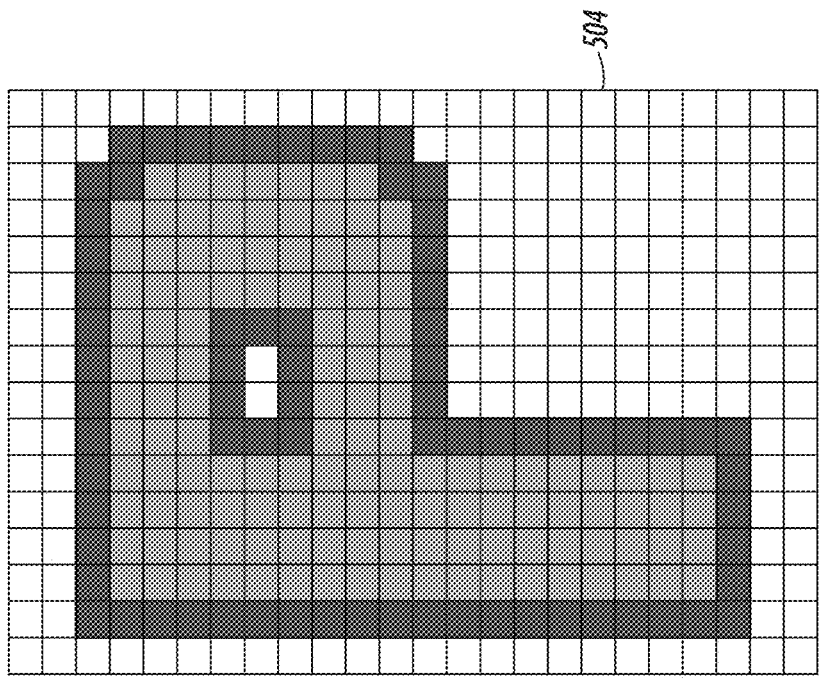
FIG. 5A and FIG. 5B illustrate an example of an output image.
Figure 5B:
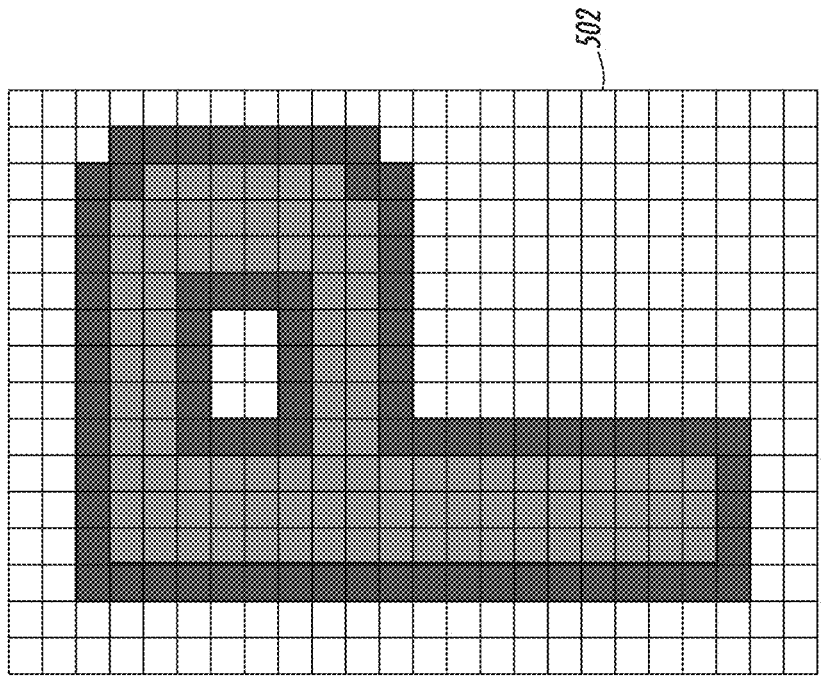

Returning to the present subject matter, when the input image is converted, the digital bitmap image having the fill object may look like one of the fill object 402 and 404 shown in FIG. 4A and FIG. 4B, respectively.

In FIG. 4A, the fill object 402 has edge pixels 408 and interior (or fill) pixels 410. Edge pixels 408 are stroke pixels which have a separate width of 1 pixel. The width of the stroke pixel is generally set by a user while designing a particular job. The edge pixels 408 of the fill object 402 have different color than the color of the interior pixels 410. The interior pixels 410 define a fill region or an interior region of the fill object 402.

Similarly, in FIG. 4B, the fill object 404 has same configuration as that of the fill object 402. However, the color of the edge pixels 408 in the fill object 404 is the same color of the background pixels 406. Because of this reason, the edge pixels 408 are not visible in fill object 404. Alternatively, as can appreciated by those skilled in the art that the fill object 404 has no edge pixels at all and edge pixels of 1 pixel width are considered for the implementation of the present subject matter.

Once the fill objects 402 or 404 are obtained in digital bitmap image, the RIP 216 determines the background pixels 406, the edge pixels 408, and the interior pixels 410 for the fill object 402 or 404 based on the associated tag information and pixel values. The RIP 216 of the DFE module 210 then fattens the edge pixels 408 and the interior pixels 410 by the user-defined amount. In an example, the user-defined amount can be 1 pixel (FIG. 5A) or 2 pixels (FIG. 5B) depending on user's choice or selection. The edge pixels 408 are fattened in such a way that the fattening of the edge pixels 408 is restricted or limited to the background pixels 406. Further, the interior pixels 410 are fattened by the user-defined amount for applying fill thickening to the interior region defined by the interior pixels 410. For example, the interior pixels can be fattened by 1 pixel (FIG. 5A) or 2 pixels (FIG. 5B) depending on user's choice or selection. With such thickening or fattening, the digital rear end (DRE) module 212 flattens the edge pixels 408 and the interior pixels 410 to generate an output image 502, 504 for printing at the printer 104-1 or 104-2, in such a way that a pixel assumes color of the interior pixels 410 if the pixel is interior pixel originally or becomes interior pixel through the fattening of the interior pixels 410, and that a pixel assumes color of the edge pixels 408 if the pixel is an edge pixel originally or becomes edge pixel through the fattening of the edge pixels 408. Then, the DRE module 212 calls the print engine 218. The print engine 218 then converts the output image 502, 504 into a ready-to-print (RTP) format. The converted output image is either stored on the printing system 108 for processing or is provided to the printer 104-1 or 104-2 for printing purpose.

Thus, with the implementation of the present subject matter, interior (fill) region of the fill object 402 or 404 can be thickened or expanded as per user's choice without affecting the thickness of the edge or stroke of the fill object 402 or 404, so that the effect of the edge pixels 408 on the fill object 402 or 404 remains the same. Further, the implementation of present subject matter achieves the effect of fill (interior) thickening without undesirable artefacts. Also, the present subject matter ensures no content loss and no additional artefacts to the fill object 402 or 404 occur.

In the above description, although the fattening of the edge pixels 408 is performed by the DFE module 210 and the flattening of the edge pixels 408 is performed by the DRE module 212, but, as per an exemplary implementation of the present subject matter, the DRE module 212 may perform both the fattening and the flattening of the edge pixels 408 at the same time.

Further, although the operation of the present subject matter is described in relation to the printing system 108, but the description is equally applicable or operation-able by any multifunctional device connected to the network 106. The multifunctional device can include the printer 104-1. As can be seen in FIG. 1, the printer 104-1 can also include the necessary modules for implementation of the present subject matter. For example, the printer 104-1 may include the digital front end (DFE) module 210 having the raster image processor (RIP) 216 and a digital rear end (DRE) module 212 having the print engine 218.

Figure 6:
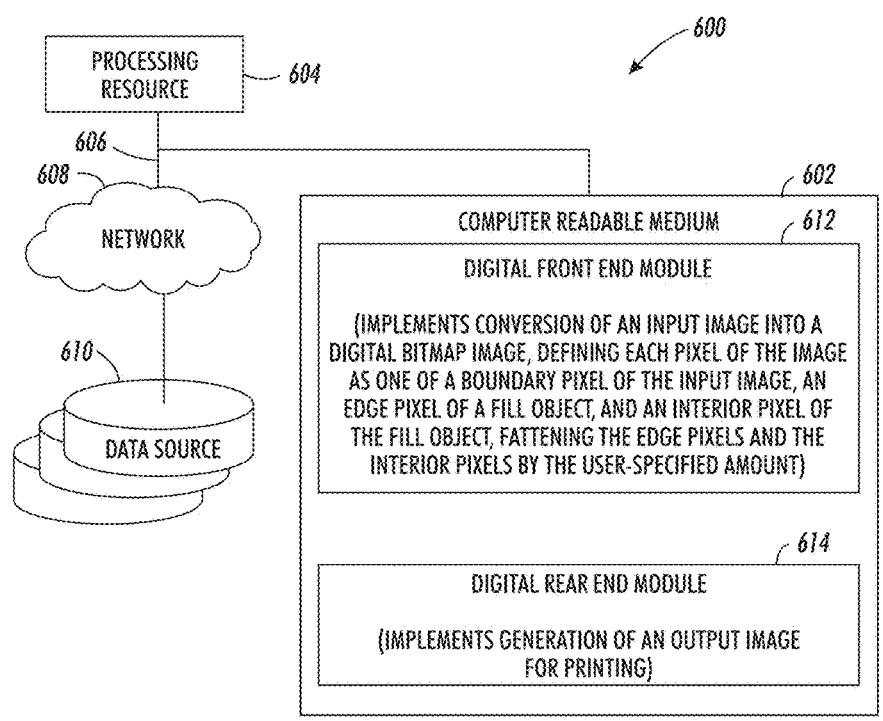
FIG. 6 illustrates an example computing environment for implementing the present subject matter.

FIG. 6 illustrates an example computing environment 600 using a non-transitory computer readable medium 602 for performing operation of the printing system 108 or the printer 104-1, according to an implementation of the present subject matter. The computing environment 600 may be a public computing environment or a private computing environment. In one example, the computing environment 600 includes a processing resource 604 communicatively coupled to the non-transitory computer readable medium 602 through a communication link 606.

For example, the processing resource 604 can be a processor, such as a control device of the printing system 108 or the printer 104-1. The non-transitory computer readable medium 602 can be, for example, an internal memory device or an external memory device. In one example, the communication link 606 may be a direct communication link, such as one formed through a memory read/write interface. In another example, the communication link 606 may be an indirect communication link, such as one formed through a network interface. In such a case, the processing resource 604 can access the non-transitory computer readable medium 602 through a network 608. The network 608 may be a single network or a combination of multiple networks and may use a variety of communication protocols.

The processing resource 604 and the non-transitory computer readable medium 602 may also be communicatively coupled to data sources 610 over the network 608. The data sources 610 can include, for example, databases and computing devices. The data sources 610 may be used by the database administrators and other users to communicate with the processing resource 604.

In one example, the non-transitory computer readable medium 602 can include a set of computer readable instructions, such as a digital front end (DFE) module 612 and a digital rear end (DRE) module 614. The set of computer readable instructions, referred to as instructions hereinafter, can be accessed by the processing resource 604 through the communication link 606 and subsequently executed to perform acts for network service insertion. In other words, during operation, the processing resource 604 can execute the DFE module 612 and DRE module 614.

On execution by the processing resource 604, the DFE module 612 can receive a print job in the form of page description language (PDL) file. The PDL file may include information about various fill objects, say, characters, words, text, graphics, photos, and the like, contained in the input image present in the PDL file. The information may describe the appearance of the fill objects present within the input image, and may include a set of programming language commands for processing the input image based on the information. In one example, the PDL file may include information on how to process the input image based on what PDL the input image is described in.

Further, based on the commands and the information present in the PDL file, the DFE module 612 decomposes the PDL file to determine whether any graphic object in the input image is selected by the user for performing fill thickening, followed with determining whether the selected graphic object is a fill object. In case it is determined that the option has been selected for the fill object, the DFE module 612 converts the input image present in the PDL file into a digital bitmap image comprised of an array of pixels. In an example, each pixel comprised in the digital bitmap image is assigned with object tag information and pixel value.

Based on the object tag information and the pixel value, the DFE module 612 determines boundary pixels, edge pixels of the fill object, and interior pixels of the fill object in the digital bitmap image. Upon determination, the DFE module 612 fattens the edge pixels and the interior pixels of the fill object by the user-specified amount. In an example, the user-specified amount can be 1 pixel or 2 pixels depending on user's choice or selection. The edge pixels are fattened in such a way that the fattening of the edge pixels is restricted or limited to the background pixels. The interior pixels are fattened by the user-specified amount for applying thickening to the interior region defined by the interior pixels. With such thickening or fattening, a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels, to generate an output image for printing at the printer 104.

Thus, with the implementation of the present subject matter, interior (fill) region of the fill object can be thickened or expanded as per user's choice without affecting the thickness of the edge or stroke of the fill object, so that the effect of the edge pixels on the fill object remains the same. Further, the implementation of present subject matter achieves the effect of fill (interior) thickening without undesirable artefacts. Also, the present subject matter ensures no content loss and no additional artefacts of the fill object occur.

Figure 7:
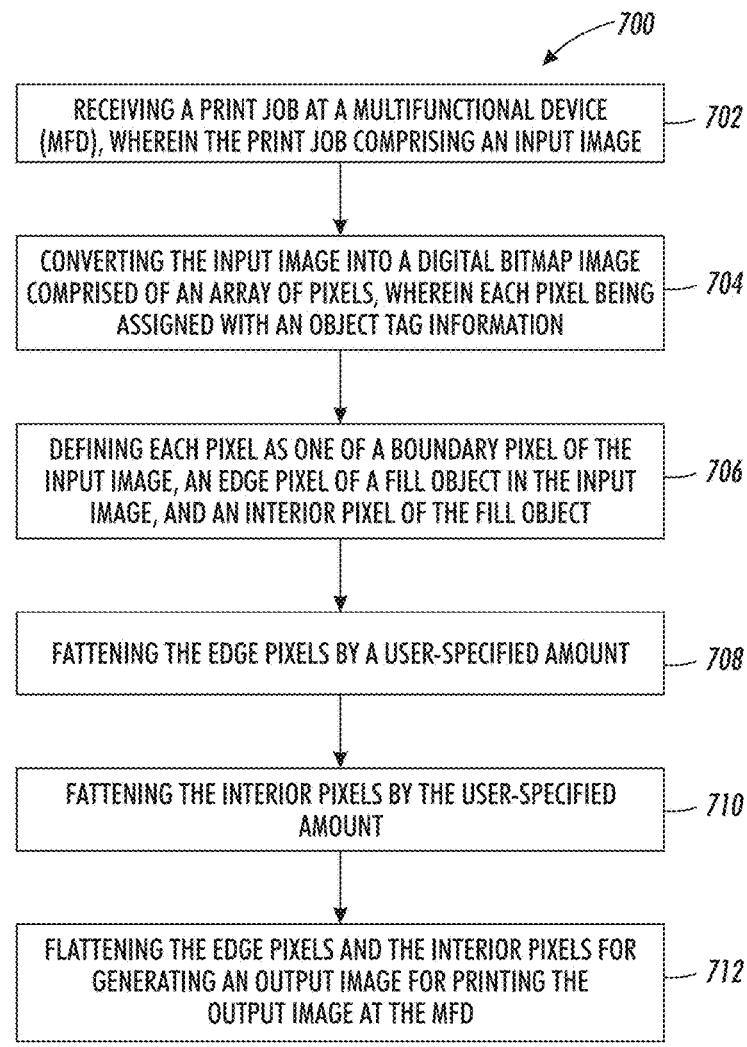
FIG. 7 illustrates a method for thickening an interior region of a fill object, according to an implementation of the present subject matter.

Method 700 is described in FIG. 7 for thickening an interior region of a fill object, on a multifunctional device (MFD) such as the printer 104-1, according to an implementation of the present subject matter. The order in which the method 700 is described is not intended to be construed as a limitation, and any number of the described method blocks can be combined in any appropriate order to carry out the method 700 or an alternative method. Additionally, individual blocks may be deleted from the method 700 without departing from the scope of the subject matter described herein.

The method 700 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 7, the method 700 may be performed by a processing device, such as a processor of the MFD such as the printer 104-1.

At block 702, the MFD 104-1 receives a print job from a user device, say user device 102-2. The print job is received in the form of page description language (PDL) file. The PDL file may include information about various fill objects, say, characters, words, text, graphics, photos, and the like, contained in the input image present in the PDL file. The information may describe the appearance of the fill objects present within the input image, and may include a set of programming language commands for processing the input image based on the information. In one example, the PDL file may include rendering information on how to render the file objects present in the input image.

At block 704, the input image is converted into a digital bitmap image comprised of an array of pixels, wherein each pixel being assigned with a pixel value and an object tag information. In one example, based on the commands and information stored in PDL file, the PDL file is decomposed to determine whether any graphic object in the input image is selected by the user for performing fill thickening, followed with determining whether the selected graphic object is a fill object. In case it is determined that the fill thickening option has been selected for any fill object, the input image present in the PDL file is converted into a digital bitmap image comprised of an array of pixels.

At block 706, based on the object tag information and the pixel value, each pixel is defined as one of a boundary pixel of the input image, an edge pixel of a fill object in the input image, and an interior pixel of the fill object.

At block 708, once the background pixels, the edge pixels, and the interior pixels are determined or defined for the fill object based on the associated tag information and pixel values, the edge pixels and the interior pixels of the fill object are fattened by the user-specified amount. In an example, the user-specified amount can be 1 pixel or 2 pixels depending on user's choice or selection. The edge pixels are fattened in such a way that fattening of the edge pixels is restricted or limited to the background pixels.

At block 710, along with the fattening of the edge pixels, the interior pixels of the fill object are fattened by the user-specified amount for applying fill thickening or fattening to the interior region defined by the interior pixels. In an alternate implementation, the fattening could be done in different ways. For example, the fattening of the edge pixels and the interior pixels of the fill object can be performed in simultaneously. In other words, the fattening of the edge pixels and the fattening of the interior pixels can be performed in single operation cycle.

At block 712, the edge pixels and the interior pixels are flattened to generated an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

Thus, with the implementation of the present subject matter, interior (fill) region of the fill object can be thickened or expanded as per user's choice without affecting the thickening of the edge or stroke of the fill object, so that the effect of the edge pixels on the fill object remains the same. Further, the implementation of present subject matter achieves the effect of fill (interior) thickening without undesirable artefacts. Also, the present subject matter ensures no content loss and no additional artefacts of the fill object occur.

Further, the present subject matter is disclosed herein with reference to an image processing architecture; however, the subject matter is equally applicable to printing systems implemented in multi-functional devices, such as printers, copiers, and the like, which are in direct communication with the user devices.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing," or "determining," or "converting," or "defining," or "fattening," or "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for thickening an interior region of a fill object, the method being implemented in a multifunctional device (MFD) having a processor, the method comprising:
   receiving a print job at the MFD, wherein the print job comprising an input image;
   converting the input image into a digital bitmap image comprised of an array of pixels, wherein each pixel being assigned with a pixel value and an object tag information;
   based on the pixel value and the object tag information, defining each pixel as one of a boundary pixel of the input image, an edge pixel of the fill object in the input image, and an interior pixel of the fill object;
   fattening the edge pixels of the fill object by a user-specified amount;
   fattening the interior pixels of the fill object by the user-specified amount for applying thickening to the interior region defined by the interior pixels; and
   flattening the edge pixels and the interior pixels to generate an output image for printing the output image at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

2. The method as claimed in claim 1, wherein the receiving comprising receiving the print job in a PDL file from a user device.

3. The method as claimed in claim 1, wherein the converting comprising:
   decomposing the print job using commands and information stored in the print job to extract the input image; and
   performing raster image processing on the input image to convert the input image into the digital bitmap image.

4. The method as claimed in claim 1, wherein fattening the edge pixels comprising fattening the edge pixels within the limits of the background pixels.

5. The method as claimed in claim 1, wherein the user-specified amount is either 1 pixel or 2 pixels depending on user's choice or selection.

6. A multifunctional device (MFD) for thickening an interior region of a fill object, comprising:
   a processor;
   a digital front end (DFE) module, coupled to the processor, to:
      receive a print job at a multifunctional device (MFD), wherein the print job comprising an input image;
      convert the input image into a digital bitmap image comprised of an array of pixels, wherein each pixel being assigned with a pixel value and an object tag information;
      based on the pixel value and the object tag information, define each pixel as one of a boundary pixel of the input image, an edge pixel of the fill object in the input image, and an interior pixel of the fill object; and simultaneously fatten the edge pixels and the interior pixels of the fill object by a user-specified amount for applying thickening on an interior region defined by the interior pixels; and a digital rear end (DRE) module, coupled to the processor, to flatten the edge pixels and the interior pixels for generating an output image for printing at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

7. The multifunctional device as claimed in claim 6, wherein the DFE module receives the print job in a PDL file from a user device.

8. The multifunctional device as claimed in claim 6, wherein the DFE module includes an image raster processor to:
decompose the print job using commands and data stored in the print job to extract the input image; and
perform raster image processing on the input image to convert the input image into the digital bitmap image.

9. The multifunctional device as claimed in claim 6, wherein the DFE module is to:
fatten the edge pixels within the limits of the background pixels.

10. The multifunctional device as claimed in claim 6, wherein the user-specified amount is either 1 pixel or 2 pixels depending on user's choice or selection.

11. A non-transitory computer-readable medium comprising instructions executable by a processing resource to:
convert an input image into a digital bitmap image comprised of an array of pixels, wherein each pixel being assigned with a pixel value and an object tag information;
based on the pixel value and the object tag information, define each pixel as one of a boundary pixel of the input image, an edge pixel of the fill object in the input image, and an interior pixel of the fill object;
simultaneously fatten the edge pixels and the interior pixels of the fill object by a user-specified amount for applying thickening on an interior region defined by the interior pixels; and
flatten the edge pixels and the interior pixels to generate an output image for printing at a multifunctional device (MFD) in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

12. The non-transitory computer-readable medium as claimed in claim 11 comprising instructions executable by the processing resource to:
receive the print job in a PDL file from a user device.

13. The non-transitory computer-readable medium as claimed in claim 11 comprising instructions executable by the processing resource to:
decompose the print job using commands and data stored in the print job to extract the input image; and
perform raster image processing on the input image to convert the input image into the digital bitmap image.

14. The non-transitory computer-readable medium as claimed in claim 11 comprising instructions executable by the processing resource to:
fatten the edge pixels within the limits of the background pixels.

15. The non-transitory computer-readable medium as claimed in claim 11, wherein the user-specified amount is either 1 pixel or 2 pixels depending on user's choice or selection.

16. A method for thickening an interior region of a fill object, the method being implemented in a multifunctional device (MFD) having a processor, the method comprising:
receiving a print job at the MFD, wherein the print job comprising an input image;
converting the input image into a digital bitmap image comprised of an array of pixels, wherein each pixel being assigned with a pixel value representing printing information;
based on the pixel value, defining each pixel as one of a boundary pixel of the input image, an edge pixel of a fill object in the input image, and an interior pixel of the fill object;
simultaneously fattening the edge pixels and the interior pixels of the fill object by a user-specified amount for applying thickening to the interior region defined by the interior pixels; and
flattening the edge pixels and the interior pixels for generating an output image for printing the output image at the MFD in such a way that a pixel assumes color of the interior pixels if the pixel is interior pixel originally or becomes interior pixel through the fattening of the interior pixels, and that a pixel assumes color of the edge pixels if the pixel is an edge pixel originally or becomes edge pixel through the fattening of the edge pixels.

17. The method as claimed in claim 16, wherein the receiving comprising receiving the print job in a PDL file from a user device.

18. The method as claimed in claim 16, wherein the converting comprising:
decomposing the print job using commands and information stored in the print job to extract the input image; and
performing raster image processing on the input image to convert the input image into the digital bitmap image.

19. The method as claimed in claim 16, wherein fattening the edge pixels comprising fattening the edge pixels within the limits of the background pixels.

20. The method as claimed in claim 16, wherein the user-specified amount is either 1 pixel or 2 pixels depending on user's choice or selection.

* * * * *